US011673584B2

(12) United States Patent
Wang et al.

(10) Patent No.: US 11,673,584 B2
(45) Date of Patent: Jun. 13, 2023

(54) BAYESIAN GLOBAL OPTIMIZATION-BASED PARAMETER TUNING FOR VEHICLE MOTION CONTROLLERS

(71) Applicant: Baidu USA LLC, Sunnyvale, CA (US)

(72) Inventors: Yu Wang, Sunnyvale, CA (US); Qi Luo, Sunnyvale, CA (US); Jiaxuan Xu, Sunnyvale, CA (US); Jinyun Zhou, Sunnyvale, CA (US); Shu Jiang, Sunnyvale, CA (US); Jiaming Tao, Sunnyvale, CA (US); Yu Cao, Sunnyvale, CA (US); Wei-Man Lin, Sunnyvale, CA (US); Kecheng Xu, Sunnyvale, CA (US); Jinghao Miao, Sunnyvale, CA (US); Jiangtao Hu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 482 days.

(21) Appl. No.: 16/849,817

(22) Filed: Apr. 15, 2020

(65) Prior Publication Data
US 2021/0323578 A1 Oct. 21, 2021

(51) Int. Cl.
*G06N 20/00* (2019.01)
*B60W 50/00* (2006.01)
(Continued)

(52) U.S. Cl.
CPC ...... *B60W 60/0025* (2020.02); *B60W 50/045* (2013.01); *G06F 17/18* (2013.01); *G06N 20/00* (2019.01); *B60W 2050/0014* (2013.01)

(58) Field of Classification Search
CPC ........... B60W 60/0025; B60W 50/045; B60W 2050/0014; B60W 60/001; B60W 2050/0013; B60W 2050/0088; B60W 60/0016; B60W 50/00; B60W 2050/0034; G06F 17/18; G06N 20/00; G06N 5/003; G06N 7/005; G06N 20/10
See application file for complete search history.

(56) References Cited

U.S. PATENT DOCUMENTS

| 2019/0332110 A1* | 10/2019 | Isele | G06N 3/006 |
| 2019/0377795 A1* | 12/2019 | Aggarwal | G06F 40/30 |
| 2020/0218271 A1* | 7/2020 | Krystek | G06F 16/285 |

* cited by examiner

*Primary Examiner* — Peter D Nolan
*Assistant Examiner* — Ashley L Redhead, Jr.
(74) *Attorney, Agent, or Firm* — Womble Bond Dickinson (US) LLP

(57) ABSTRACT

In one embodiment, a computer-implemented method for optimizing a controller of an autonomous driving vehicle (ADV) includes obtaining several samples, each sample having a set of parameters, iteratively performing, until a predetermined condition is satisfied: determining, for each sample, a score according to a configuration of the controller based on the set of parameters of the sample, applying a machine learning model to the samples and corresponding scores to determine a mean function and a variance function, producing a new sample as a minimum of a function of the mean function and the variance function with respect to an input space of the set of parameters, adding the new sample to the several samples, and outputting the new sample as an optimal sample, where parameters of the optimal sample are utilized to configure the controller to autonomously drive the ADV.

20 Claims, 6 Drawing Sheets

(51) Int. Cl.
  *B60W 60/00* (2020.01)
  *B60W 50/04* (2006.01)
  *G06F 17/18* (2006.01)

BAYESIAN GLOBAL OPTIMIZATION-BASED PARAMETER TUNING FOR VEHICLE MOTION CONTROLLERS

TECHNICAL FIELD

Embodiments of the present disclosure relate generally to operating autonomous vehicles. More particularly, embodiments of the disclosure relate to Bayesian Global Optimization-based parameter tuning for vehicle motion controllers.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

A vehicle controller of an autonomous vehicle may generate control commands to move the vehicle according to a desired path or route. For example, a model predictive controller (MPC) may generate a sequence of commands to be applied over future time frames that would cause a controlled object to move along a predicted path. The MPC may be configured according to one or more control parameters to optimize the sequence of commands such that the controller is able to control an autonomous driving vehicle (ADV) to track along a target path with target speeds.

Tuning control parameters play an important role in controller design. Conventionally, a controller's parameters may be tuned by either human observers (e.g., by engineers in a controlled setting, such as a laboratory) or a brute-force search using grid-search algorithms. One problem with the first solution is that optimization of the control parameters may not be guaranteed since the solution is highly relied upon human experience and intuition. With respect to the second solution, such a brute-force search has low efficiency, especially when a configuration space becomes relatively high, and thereby can exponentially increase computational cost.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Figure 1:
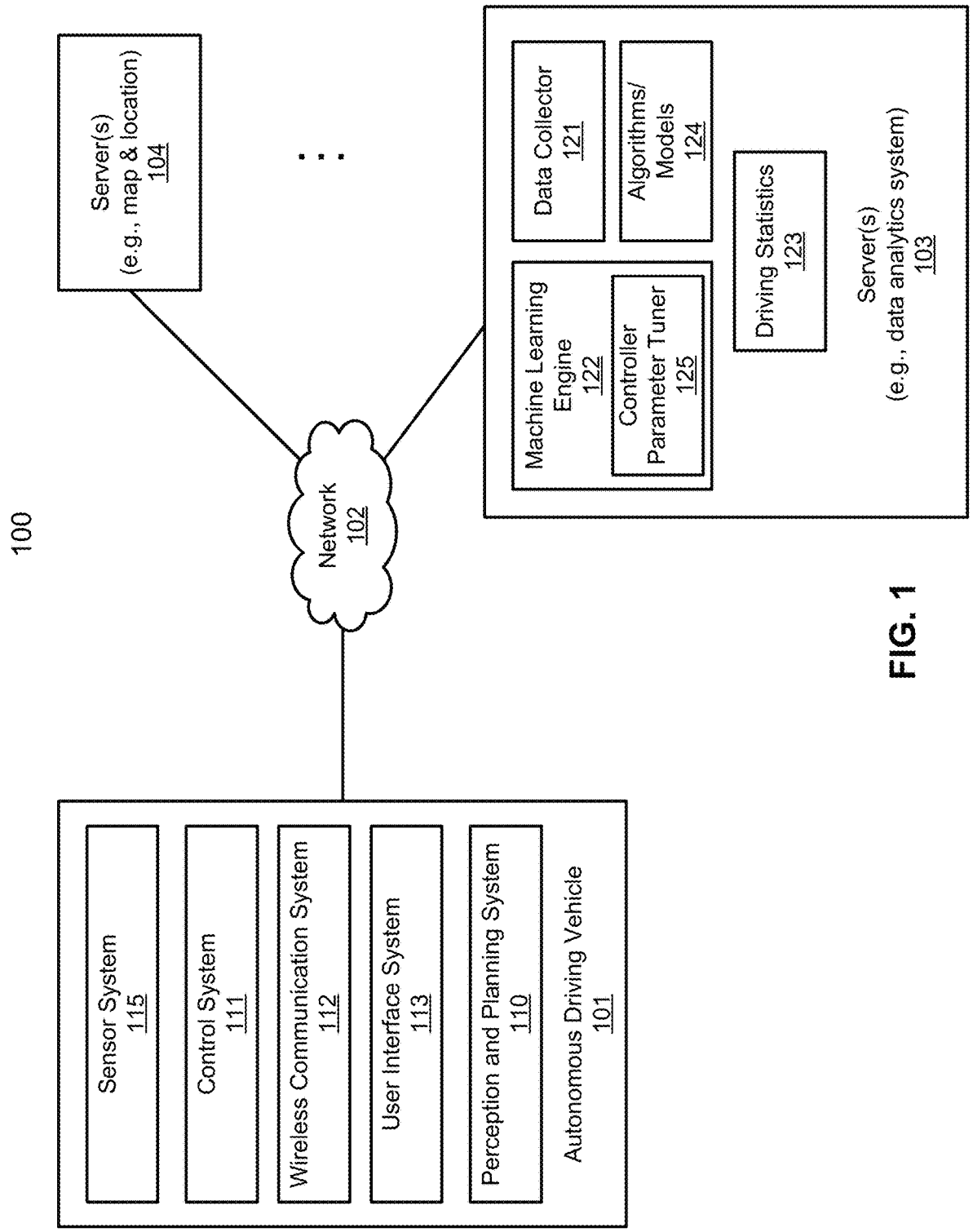
FIG. 1 is a block diagram illustrating a networked system according to one embodiment.

Several embodiments of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

The present disclosure solves the problem of optimizing controller parameters by applying Bayesian Global Optimization and Gaussian Process Regression (GPR) to parameter tuning for controllers, such as motion controllers used by autonomous driving vehicles (ADVs). In particular, the present disclosure describes using Bayesian optimization techniques to find an optimal controller (parameter) configuration using a GPR model as (an approximation of) the objective function (e.g., a surrogate model). For example, samples of controller parameters that are to be tuned are obtained (e.g., randomly generated). For each sample, a score (or label) is generated by simulating a controller that is configured according to one or more parameters of the sample. The sample set and corresponding scores are fit into a machine learning model, such as a GPR model to derive a mean predictive function and a variance function. Using the derived functions, a next most promising point to sample is determined. The new sample is added to the set of samples and the process is repeated (e.g., for a predetermined amount of iterations) in order to define sufficient exploration of the sample space. Once the process has performed a sufficient number of iterations, the most optimal sample is outputted based on the Bayesian Global Optimization of the GPR model. Parameters of the optimal sample may be utilized to configure the controller to autonomously drive the ADV. Thus, the present disclosure optimizes controller parameters by reducing the overall cost (or negative control profiling score).

According to some embodiments, a computer-implemented method for optimizing a controller of an ADV includes obtaining several samples, each sample having a set of parameters; iteratively performing, until a predetermined condition is satisfied: determining, for each sample, a score according to a configuration of the controller based on the set of parameters of the sample, applying a machine learning model to the several samples and corresponding scores to determine a mean function and a variance function, producing a new sample as a minimum of a utility function which combines the mean function and the variance function with respect to an input space of the set of parameters, adding the new sample to the several samples; and outputting the new sample as an optimal sample, where parameters of the optimal sample are utilized to configure the controller to autonomously drive the ADV.

In one embodiment, obtaining the several samples comprises randomly generating at least some of the samples. In another embodiment, the machine learning model is a Gaussian Process Regression (GPR) model. In some embodiments, the machine learning model is a Tree Parzen Estimator (TPE) model. In one embodiment, determining a score comprises, for each sample, configuring the controller with one or more parameters of the set of parameters of the sample; and simulating a performance of the configured controller, wherein the score indicates the performance of the simulation. In another embodiment, each parameter of the set of parameters is a weight that is associated with a cost term of a cost function that is used by a motion controller of an autonomous driving vehicle (ADV) to generate a control command to autonomously navigate the ADV.

In one embodiment, each new sample is produced based on previously produced new samples being added to the several samples. In another embodiment, the predetermined condition is a predetermined number of new samples that are to be produced.

In another embodiment of the disclosure, a non-transitory machine-readable medium and a data processing system perform at least some of the processes as described herein.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
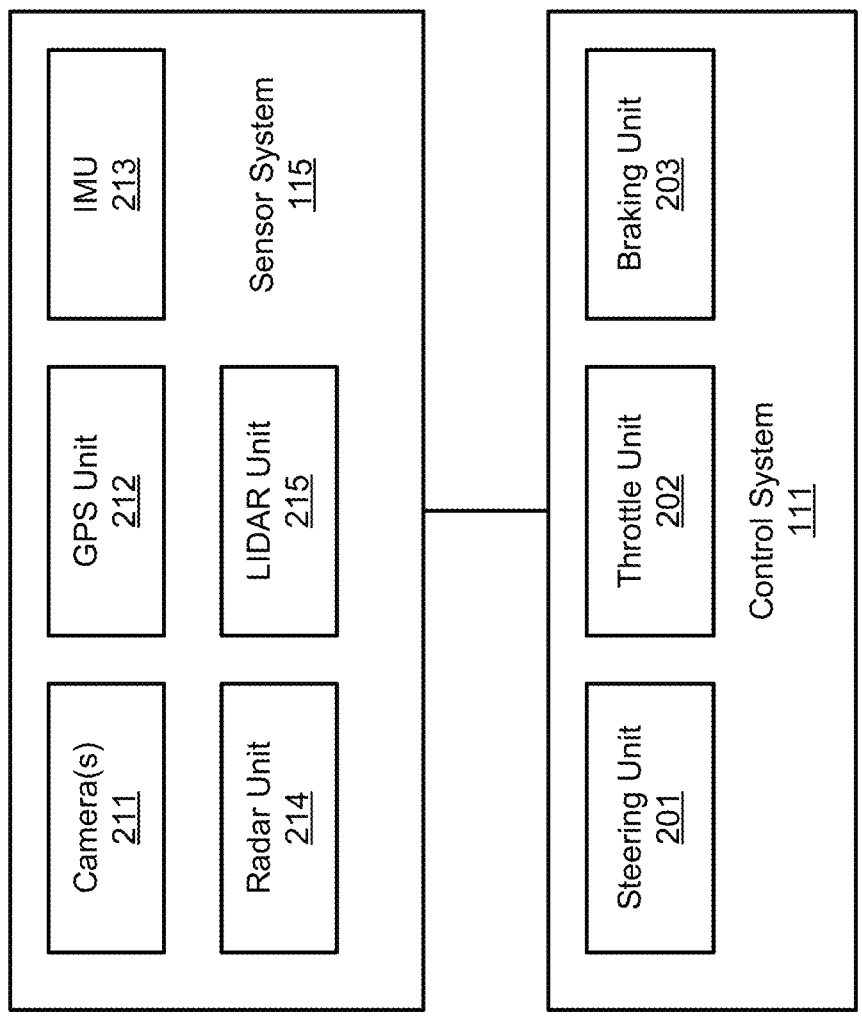
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, predictive models 124 may include parametric and/or non-parametric models. For instance, the models may include a Gaussian Process Regression (GPR) model and/or a Tree Parsen Estimator (TPE) model, each of which may be used for parameter tuning as described herein.

As shown, the machine learning engine 122 includes a controller parameter tuner 125 that is configured to perform Bayesian Global Optimization-based parameter tuning, as described herein. In one embodiment, the tuner 125 may be configured to tune one or more parameters of any type of (e.g., motion) controller. For example, the tuner may be configured to tune parameters of a proportional-integral-derivative (PID) controller, a Linear Quadratic Regulator (LQR) controller, or a Model Predictive Control (MPC) controller.

In one embodiment, controller parameters (or parameters) may be any type of parameter (or setting) of a controller. For instance, a PID controller may have at least three parameters, one parameter for proportional gain, one parameter for integral gain, and one parameter for derivative gain. As another example, the parameters may be weights that are associated and applied to cost terms of a cost function that is used by a motion controller (e.g., a MPC controller) of an ADV to generate control commands in order to autonomously navigate the ADV. More about motion controllers is described herein.

Algorithms 124 can then be uploaded on ADVs to be utilized during autonomous driving in real-time. In one embodiment, one or more controller parameters that are optimally tuned, as described herein, may be uploaded on ADVs to be utilized by motion controllers operating therein in real-time.

Figure 3:
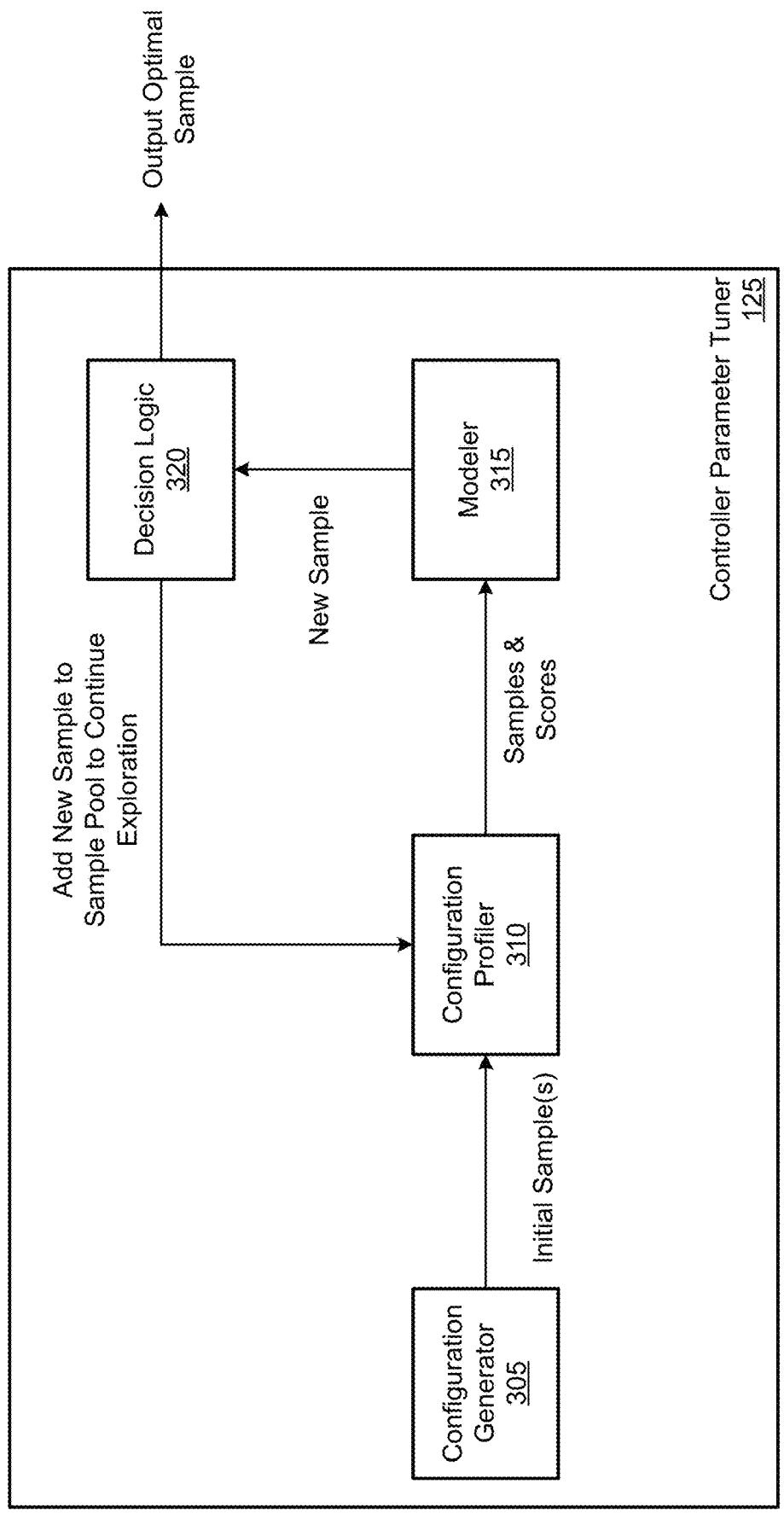
FIG. 3 is a block diagram illustrating an example of a controller parameter tuner according to one embodiment.

FIG. 3 is a block diagram illustrating an example of a controller parameter tuner according to one embodiment. As described herein, the controller parameter tuner 125 may be executed by (e.g., one or more processors of) the server 103 in order to optimally tune one or more controller parameters that may be used by a motion controller of an ADV. The tuner includes a configuration generator 305, a configuration profiler 310, a modeler 315, and decision logic 320. The generator is configured to generate one or more (initial) samples of controller parameters. For example, the generator may generate $x_m$ samples, where each x sample includes d parameters for which the tuner is to optimally tune. Thus, the generator produces a data set including d-dimensional vectors $x_m \in Rd$, where each training point represents a control parameter setting. For example, for a PID controller, m=3. In one embodiment, the generator may randomly generate at least some of the samples $x_m$. In another embodiment, the generator may obtain one or more samples from a library or from user-input.

The configuration profiler 310 is configured to obtain the sample pool (e.g., initial samples from the configuration generator 305), and is configured to determine a score (or label), y, for each sample according to a configuration of a controller based on the parameters of the sample. Specifically, the profiler configures a controller (e.g., associated with the d parameters) with one or more parameters of the sample. The profiler then evaluates the configured profiles response. Specifically, the profiler simulates a performance of the configured controller, and produces a score that indicates the performance of the simulation. Thus, the profiler produces a score for each sample, thereby producing $y_m \in R$, which represents a negative control profiling score. In one embodiment, a low score (e.g., below a threshold) indicates a low (or less desirable) performance of the controller, while a high score (e.g., above the threshold) indicates a high (or more desirable) performance of the controller.

The modeler 315 is configured to obtain $x_m$ and $y_m$, and is configured to apply (or train) a machine learning model, such as a GPR model to the obtained samples and scores (e.g., as training data). Once applied, the Gaussian process may be updated to predict a score, y*, for an input sample x*. In one embodiment, the input sample is a test input sample during a first pass through the Gaussian process. In another embodiment, the input sample may be a new sample that is produced by a previous iteration of the Bayesian Global Optimization, as described herein. The output of the GPR process being a mean function, h(x*), and a variance function, v(x*), which defines a predictive Gaussian process as $$y^* = h(x^*) = K(x^*,X)[K(X,X)+\sigma_n^2 I]^{-1} y$$

$$v(x^*) = K(x^*,x^*) - K(x^*,X)[K(X,X)+\sigma_n^2 I]^{-1} K(X,x^*)$$

where X is the whole input space, x* is the input sample, $\sigma_n^2$ is the variance of noise, I is the identity matrix, y is one or more scores, and K is a kernel function.

The modeler 315 is configured to produce a new sample, X*, as $$X^* = \arg\min_{X_i} h(X_i) - k\sqrt{v(X_i)}$$

where the weighting factor k is selected to trade off how much to explore more potential good points with high uncertainty (e.g., with high variance), or how much to exploit the knowledge about the current best point (with the best configuration) found so far. The function $h(X_i) - k\sqrt{v(X_i)}$ is called the utility function.

Thus, the new sample X* is the minimum of the utility function which combines of the mean function and variance function with respect to the input space X of the set of parameters of the input sample. As described herein, the new sample is determined using the Gaussian model described herein. In one embodiment, the sample may be determined using any type of model, such as a TPE model in order to derive the new sample from a mean and variance function.

The decision logic 320 is configured to obtain the new sample, X*, from the modeler and is to determine whether the tuner has performed a sufficient amount of exploration. In one embodiment, the decision logic 320 may determine whether a predetermined (end) condition is met. For example, the predetermined condition may be a predetermined number of iterations or new samples that are to be produced (e.g., 100 new samples). In another embodiment, the determination may be based on an error threshold between new samples. For example, if an error (or difference) between at least some of the new samples is below a threshold (e.g., 0.1%), it may be determined that there has been a sufficient amount of exploration and that the newest sample is the most optimal.

If not, the new sample is added to the current sample pool (e.g., for a second pass, the pool is now $x_{m+1}$) thereby increasing the sampling pool in order to continue exploration. In particular, the tuner iteratively performs, so long as the end condition is not met, at least some of the operations of the configuration profiler 310 and/or the modeler 315 in order to produce new samples, where each new sample is produced based on previously produced new samples being added to the sample pool. In one embodiment, to perform the next iteration, the newest sample produced (e.g., in the previous iteration) may be the input sample for the current iteration. Thus, the tuner will continue this loop until the decision logic 320 determines that enough exploration has been performed (e.g., at new sample $x_{m+n}$). At which time, the decision logic 320 outputs an optimal sample. In one embodiment, the optimal sample is the newest sample to be produced (e.g., $x_{m+n}$). In another embodiment, the sample outputted as the optimal sample is chosen based on certain criteria (e.g., being below and/or above a threshold). In one embodiment, outputting the optimal sample may include transmitting (e.g., via a wireless network) the optimal sample as a controller configuration to one or more ADVs for utilizing the optimal sample to configure a controller to autonomously drive the ADVs.

Figure 4:
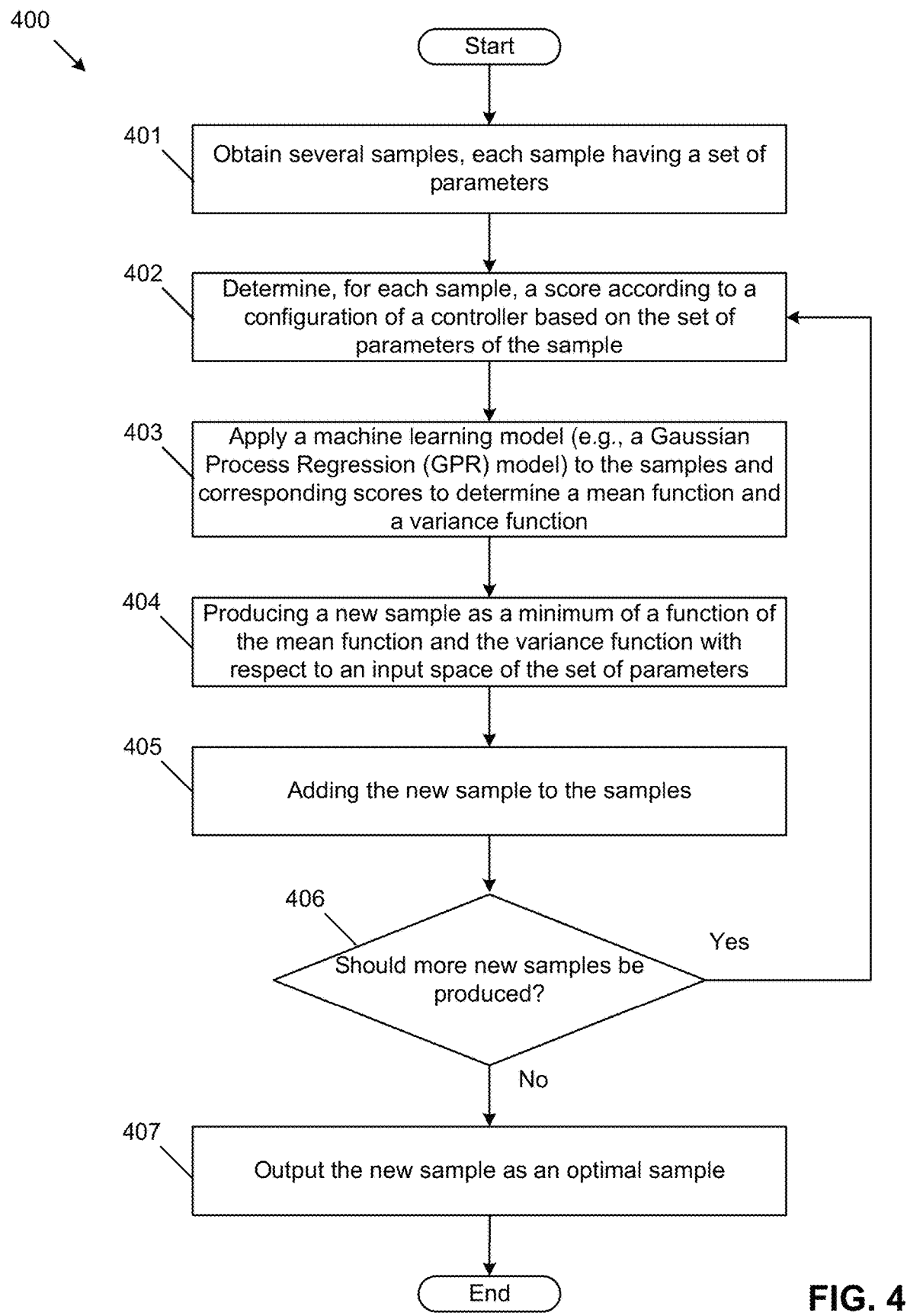
FIG. 4 is a flowchart of a process for tuning parameters of a controller according to one embodiment.

FIG. 4 is a flowchart of a process 400 for tuning parameters of a controller according to one embodiment. Specifically, the process 400 determines an optimal sample of one or more controller parameters for configuring a controller, such as a motion controller of an ADV. At least some of the operations described herein may be performed by the controller parameter tuner 125 of server(s) 103, as illustrated in FIG. 3.

The process 400 obtains several samples (as a pool of samples), each sample having a set of parameters (at block 401). For instance, the configuration generator 305 may randomly generate the samples, each having parameters that are to be optimally tuned. The process 400 determines, for each sample, a score according to a configuration of a controller based on the set of parameters of the sample (at block 402). For example, the configuration profiler 310 simulates a performance of a controller, according to a configuration based on each sample to produce a respective score. The process 400 applies a machine learning model (e.g., GPR model) to the samples and corresponding scores to determine a mean function and a variance function (at block 403). For instance, the modeler 315 trains the model and determines the functions with respect to an input sample. In one embodiment, the input sample may be a random test sample. In another embodiment, the input sample may be determined according to an acquisition function, such as an expected improvement. In some embodiments, the input sample may be a previous iteration's newly produced sample, as described herein.

The process 400 produces a new sample as a minimum of a function of the mean function and the variance function with respect to an input space of the set of parameters (at block 404). The process 400 adds the new sample to the pool of samples (at block 405). The process 400 determines whether more new samples should be produced (at decision block 406). As described herein, the decision logic 320 may determine whether an end condition is met. If so, the process 400 returns to block 402 to repeat the Bayesian Global Optimization of the GPR model. If, however, no newer samples are to be produced, the process 400 outputs the (e.g., most recently produced) new sample as an optimal sample, where parameters of the optimal sample may be utilized to configure a controller to autonomously drive an ADV (at block 407).

Some embodiments perform variations of the process 400. For example, the specific operations of the process may not be performed in the exact order shown and described. The specific operations may not be performed in one continuous series of operations, some operations may be omitted, and different specific operations may be performed in different embodiments.

Figure 5A:
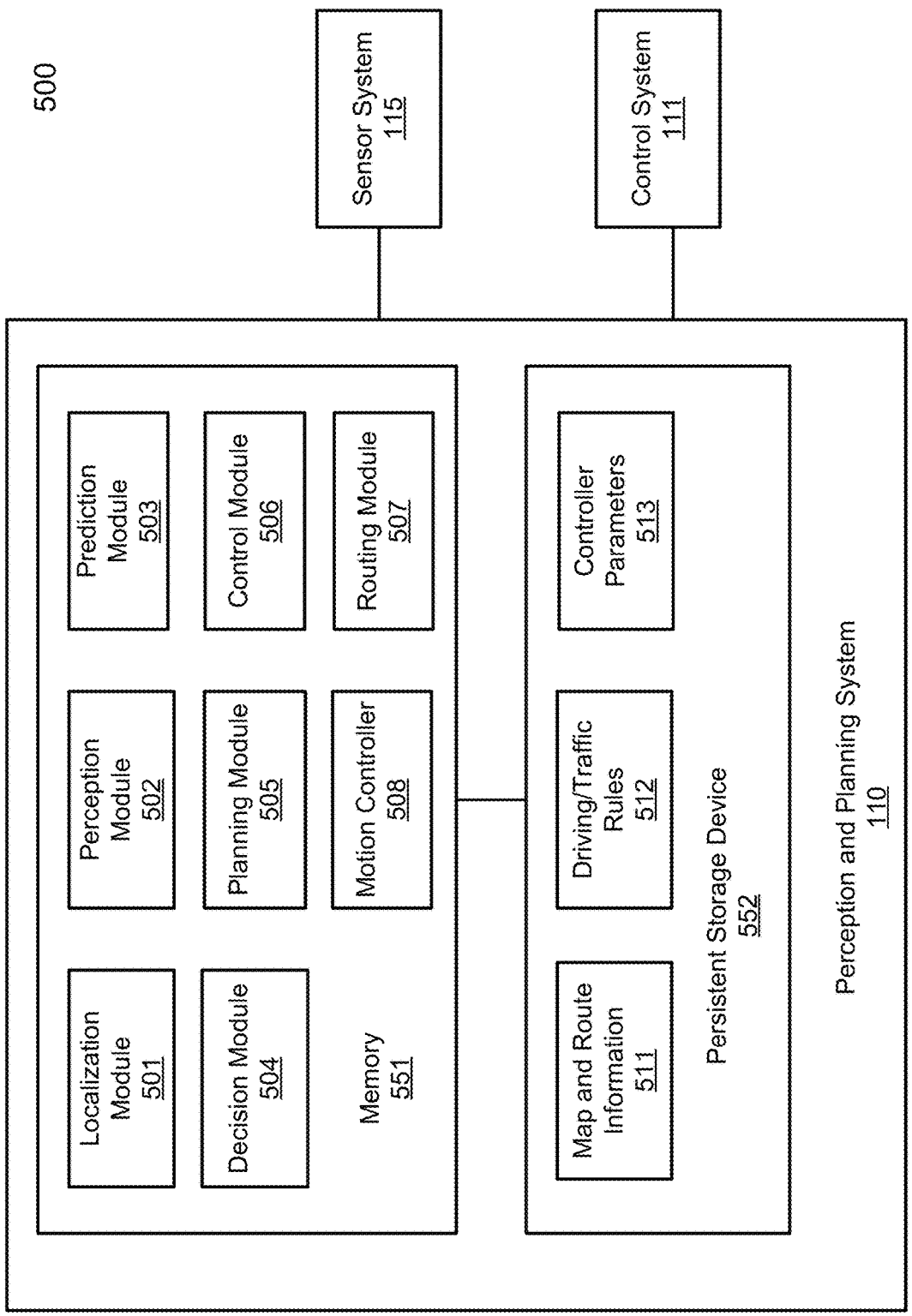
FIGS. 5A-5B are block diagrams illustrating an example of a perception and planning system used with an autonomous vehicle according to one embodiment.
Figure 5B:
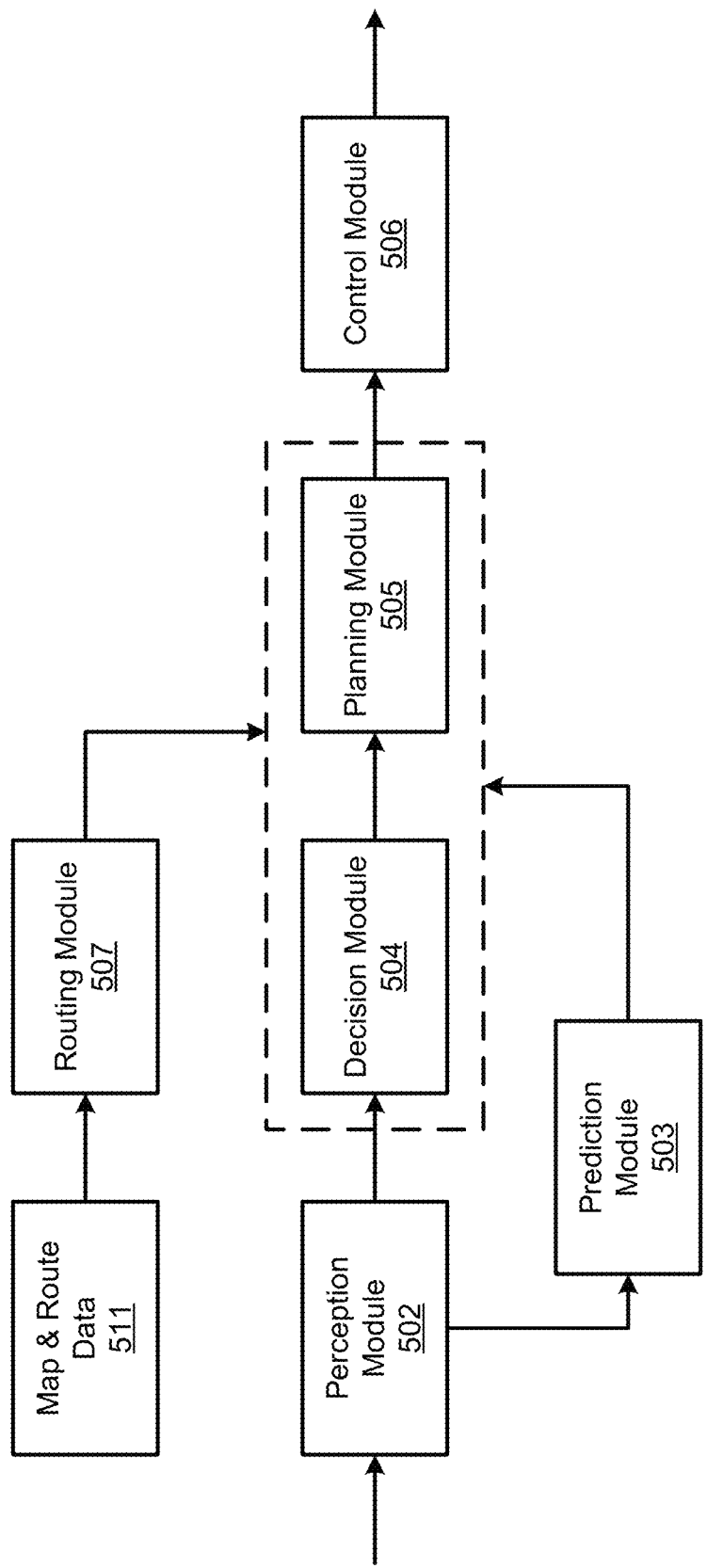

FIGS. 5A and 5B are block diagrams illustrating an example of a perception and planning system used with an autonomous vehicle according to one embodiment. System 500 may be implemented as a part of autonomous vehicle 101 of FIG. 1 including, but is not limited to, perception and planning system 110, control system 111, and sensor system 115. Referring to FIGS. 5A-5B, perception and planning system 110 includes, but is not limited to, localization module 501, perception module 502, prediction module 503, decision module 504, planning module 505, control module 506, routing module 507, and one or more motion controllers 508.

Some or all of modules 501-508 may be implemented in software, hardware, or a combination thereof. For example, these modules may be installed in persistent storage device 552, loaded into memory 551, and executed by one or more processors (not shown). Note that some or all of these modules may be communicatively coupled to or integrated with some or all modules of vehicle control system 111 of FIG. 2. Some of modules 501-508 may be integrated together as an integrated module.

Localization module 501 determines a current location of autonomous vehicle 500 (e.g., leveraging GPS unit 212) and manages any data related to a trip or route of a user. Localization module 501 (also referred to as a map and route module) manages any data related to a trip or route of a user. A user may log in and specify a starting location and a destination of a trip, for example, via a user interface. Localization module 501 communicates with other components of autonomous vehicle 500, such as map and route information 511, to obtain the trip related data. For example, localization module 501 may obtain location and route information from a location server and a map and POI (MPOI) server. A location server provides location services and an MPOI server provides map services and the POIs of certain locations, which may be cached as part of map and route information 511. While autonomous vehicle 500 is moving along the route, localization module 501 may also obtain real-time traffic information from a traffic information system or server.

Based on the sensor data provided by sensor system 115 and localization information obtained by localization module 501, a perception of the surrounding environment is determined by perception module 502. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 502 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 502 can also detect objects based on other sensors data provided by other sensors such as a radar and/or LIDAR.

For each of the objects, prediction module 503 predicts what the object will behave under the circumstances. The prediction is performed based on the perception data perceiving the driving environment at the point in time in view of a set of map/rout information 511 and traffic rules 512. For example, if the object is a vehicle at an opposing direction and the current driving environment includes an intersection, prediction module 503 will predict whether the vehicle will likely move straight forward or make a turn. If the perception data indicates that the intersection has no traffic light, prediction module 503 may predict that the vehicle may have to fully stop prior to enter the intersection. If the perception data indicates that the vehicle is currently at a left-turn only lane or a right-turn only lane, prediction module 503 may predict that the vehicle will more likely make a left turn or right turn respectively.

For each of the objects, decision module 504 makes a decision regarding how to handle the object. For example, for a particular object (e.g., another vehicle in a crossing route) as well as its metadata describing the object (e.g., a speed, direction, turning angle), decision module 504 decides how to encounter the object (e.g., overtake, yield, stop, pass). Decision module 504 may make such decisions according to a set of rules such as traffic rules or driving rules 512, which may be stored in persistent storage device 552.

Routing module 507 is configured to provide one or more routes or paths from a starting point to a destination point. For a given trip from a start location to a destination location, for example, received from a user, routing module 507 obtains route and map information 511 and determines all possible routes or paths from the starting location to reach the destination location. Routing module 507 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 504 and/or planning module 505. Decision module 504 and/or planning module 505 examine all of the possible routes to select and modify one of the most optimal routes in view of other data provided by other modules such as traffic conditions from localization module 501, driving environment perceived by perception module 502, and traffic condition predicted by prediction module 503. The actual path or route for controlling the ADV may be close to or different from the reference line provided by routing module 507 dependent upon the specific driving environment at the point in time.

Based on a decision for each of the objects perceived, planning module 505 plans a path or route for the autonomous vehicle, as well as driving parameters (e.g., distance, speed, and/or turning angle), using a reference line provided by routing module 507 as a basis. That is, for a given object, decision module 504 decides what to do with the object, while planning module 505 determines how to do it. For example, for a given object, decision module 504 may decide to pass the object, while planning module 505 may determine whether to pass on the left side or right side of the object. Planning and control data is generated by planning module 505 including information describing how vehicle 500 would move in a next moving cycle (e.g., next route/path segment). For example, the planning and control data may instruct vehicle 500 to move 10 meters at a speed of 30 mile per hour (mph), then change to a right lane at the speed of 25 mph.

Based on the planning and control data, control module 506 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 505 plans a next route segment or path segment, for example, including a target position and the time required for the ADV to reach the target position. Alternatively, planning module 505 may further specify the specific speed, direction, and/or steering angle, etc. In one embodiment, planning module 505 plans a route segment or path segment for the next predetermined period of time such as 5 seconds. For each planning cycle, planning module 505 plans a target position for the current cycle (e.g., next 5 seconds) based on a target position planned in a previous cycle. Control module 506 then generates one or more control commands (e.g., throttle, brake, steering control commands) based on the planning and control data of the current cycle.

Note that decision module 504 and planning module 505 may be integrated as an integrated module. Decision module 504/planning module 505 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

The motion controller 508 has an optimizer and a vehicle model. The optimizer can use a cost function and the vehicle model to generate a sequence of control commands (e.g., throttle, steering, and/or brake commands) that track the vehicle's path along a target vehicle trajectory. These commands are generated while optimizing for different cost terms (e.g., cross-track error, heading error, speed, steering, acceleration, rate of change in steering, and/or rate of change of acceleration). Each of the cost terms can be represented in the cost function to penalize undesirable behavior. Controller parameters 513 (or weights) can be associated and applied to each term (e.g., multiplication) to modify the impact of each term over the overall computed cost. In one embodiment, the controller parameters 513 are optimized parameters that are tuned by the controller parameter tuner 125 for the motion controller 508.

A generic example of a cost function of an MPC controller is shown below, where J is the total computed cost, $w_x$ is a weight corresponding to a term x (x=1, 2, . . . ), and N is a point along a target trajectory of the ADV.

$$J = \Sigma_{t=1}^{N} w_1 \|\text{term1}\|^2 + w_2 \|\text{term2}\|^2 + w_3 \|\text{term3}\|^2 + \Sigma_{t=1}^{N-1} w_4 \|\text{term4}\|^2 + w_5 \|\text{term5}\|^2 + \Sigma_{t=2}^{N} w_6 \|\text{term6}\|^2 + w_7 \|\text{term7}\|^2 + \ldots$$

The terms can be optimized by minimizing a computed cost J. The terms can include at least one of cross-track error (penalizing how far the ADV is from the target trajectory), heading error (penalizing an error between the ADV heading and the target trajectory direction at a point), speed cost (penalizing changes to speed), steering cost (penalizing changes in steering), acceleration cost (penalizing changes in acceleration), steering rate of change (penalizing how fast the steering changes), braking cost (penalizing braking), and acceleration rate of change (penalizing how fast acceleration changes). In some embodiments, the cost function includes at least two of the above terms. In other embodiments, the cost function includes all of the above terms. Sequential control commands (throttle, steering, braking) can be generated to optimally track the target trajectory, while accounting for the above terms.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilising terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

In some embodiments, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some embodiments, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A computer-implemented method for optimizing a controller of an autonomous driving vehicle (ADV), comprising:
    obtaining a plurality of samples, each sample having a set of controller parameters for the controller of the ADV;
    iteratively performing, until a predetermined condition is satisfied:
        determining, for each sample, a score according to a configuration of the controller based on the set of controller parameters of the sample,
        applying a machine learning model to the plurality of samples and corresponding scores to determine a mean function and a variance function,
        producing a new sample as a minimum of a function of the mean function and the variance function with respect to an input space of the set of controller parameters, and
        adding the new sample to the plurality of samples;
    responsive to the predetermined condition being satisfied, outputting a last produced new sample as an optimal sample; and
    configuring the controller of the ADV using controller parameters of the optimal sample, wherein the configured controller generates a path trajectory for the ADV and autonomously drives the ADV along the generated path trajectory.

2. The method of claim 1, wherein obtaining the plurality of samples comprises randomly generating at least some of the plurality of samples.

3. The method of claim 1, wherein the machine learning model comprises a Gaussian Process Regression (GPR) model.

4. The method of claim 1, wherein the machine learning model comprises a Tree Parzen Estimator (TPE) model.

5. The method of claim 1, wherein determining a score comprises, for each sample,
    configuring the controller with one or more controller parameters of the set of controller parameters of the sample; and
    simulating a performance of the configured controller, wherein the score indicates the performance of the simulation.

6. The method of claim 1, wherein each controller parameter of the set of controller parameters represents a weight that is associated with a cost term of a cost function that is used by the controller of the ADV to generate a control command to autonomously navigate the ADV.

7. The method of claim 1, wherein each new sample is produced based on previously produced new samples being added to the plurality of samples.

8. The method of claim 1, wherein the predetermined condition comprises a predetermined number of new samples that are to be produced.

9. A non-transitory machine-readable medium having instructions stored therein, which when executed by a processor, cause the processor to perform operations of optimizing a controller of an autonomous driving vehicle (ADV), the operations comprising:
    obtaining a plurality of samples, each sample having a set of controller parameters for the controller of the ADV;
    iteratively performing, until a predetermined condition is satisfied:
        determining, for each sample, a score according to a configuration of the controller based on the set of parameters of the sample,
        applying a machine learning model to the plurality of samples and corresponding scores to determine a mean function and a variance function,
        producing a new sample as a minimum of a function of the mean function and the variance function with respect to an input space of the set of controller parameters, and
        adding the new sample to the plurality of samples;
    responsive to the predetermined condition being satisfied, outputting a last produced new sample as an optimal sample; and
    configuring the controller of the ADV using the controller parameters of the optimal sample, wherein the configured controller generates a path trajectory for the ADV and autonomously drives the ADV along the generated path trajectory.

10. The non-transitory machine-readable medium of claim 9, wherein the machine learning model comprises either a Gaussian Process Regression (GPR) model or a Tree Parzen Estimator (TPE) model.

11. The non-transitory machine-readable medium of claim 9, wherein determining a score comprises, for each sample,
    configuring the controller with one or more controller parameters of the set of controller parameters of the sample; and
    simulating a performance of the configured controller, wherein the score indicates the performance of the simulation.

12. The non-transitory machine-readable medium of claim 9, wherein each controller parameter of the set of controller parameters represents a weight that is associated with a cost term of a cost function that is used by the controller of the ADV to generate a control command to autonomously drive the ADV.

13. The non-transitory machine-readable medium of claim 9, wherein each new sample is produced based on previously produced new samples being added to the plurality of samples.

14. The non-transitory machine-readable medium of claim 9, wherein the predetermined condition comprises a predetermined number of new samples that are to be produced.

15. A data processing system, comprising:
a processor; and
a memory coupled to the processor to store instructions, which when executed by the processor, cause the processor to perform operations of optimizing a controller of an autonomous driving vehicle (ADV), the operations including
obtaining a plurality of samples, each sample having a set of controller parameters for the controller of the ADV,
iteratively performing, until a predetermined condition is satisfied:
determining, for each sample, a score according to a configuration of the controller based on the set of controller parameters of the sample,
applying a machine learning model to the plurality of samples and corresponding scores to determine a mean function and a variance function,
producing a new sample as a minimum of a function of the mean function and the variance function with respect to an input space of the set of controller parameters, and
adding the new sample to the plurality of samples;
responsive to the predetermined condition being satisfied, outputting a last produced new sample as an optimal sample; and
configuring the controller of the ADV using the controller parameters of the optimal sample, wherein the configured controller generates a path trajectory for the ADV and autonomously drives the ADV along the generated path trajectory.

16. The data processing system of claim 15, wherein the machine learning model comprises either a Gaussian Process Regression (GPR) model or a Tree Parzen Estimator (TPE) model.

17. The data processing system of claim 15, wherein determining a score comprises, for each sample,
configuring the controller with one or more controller parameters of the set of controller parameters of the sample; and
simulating a performance of the configured controller, wherein the score indicates the performance of the simulation.

18. The data processing system of claim 15, wherein each controller parameter of the set of controller parameters represents a weight that is associated with a cost term of a cost function that is used by the controller of the ADV to generate a control command to autonomously drive the ADV.

19. The data processing system of claim 15, wherein each new sample is produced based on previously produced new samples being added to the plurality of samples.

20. The data processing system of claim 15, wherein the predetermined condition comprises a predetermined number of new samples that are to be produced.

* * * * *